United States Patent [19]

Goto et al.

[11] Patent Number: 5,182,969
[45] Date of Patent: Feb. 2, 1993

[54] HYDRAULIC CONTROL DEVICE FOR AUTOMATIC TRANSMISSION

[75] Inventors: Shigeki Goto, Kariya, Japan;

[73] Assignee: Aisin Seiki Kabushiki Kaisha, Kariya, Japan

[21] Appl. No.: 525,682

[22] Filed: May 21, 1990

[30] Foreign Application Priority Data

May 19, 1989 [JP] Japan ................. 124177

[51] Int. Cl.$^5$ .................. F16H 5/64; B60K 41/16
[52] U.S. Cl. ........................ 74/866; 74/856; 364/424.1
[58] Field of Search ............. 74/866, 867, 856; 364/424.1

[56] References Cited

U.S. PATENT DOCUMENTS

| | | | |
|---|---|---|---|
| 3,942,393 | 3/1976 | Forster et al. | 74/867 X |
| 3,956,947 | 5/1976 | Leising et al. | 74/866 |
| 4,015,488 | 4/1977 | Akeson et al. | 74/866 |
| 4,073,203 | 2/1978 | Wurst et al. | 74/866 |
| 4,338,832 | 7/1982 | Pelligrino | 74/867 X |
| 4,393,732 | 7/1983 | Suzuki et al. | 74/866 |
| 4,628,772 | 12/1986 | Nishikawa et al. | 74/866 |
| 4,633,985 | 1/1987 | Leorat | 74/867 X |
| 4,846,021 | 7/1989 | Hamano et al. | 74/867 X |
| 4,879,925 | 11/1989 | Taga et al. | 74/867 |
| 4,896,569 | 1/1990 | Ito et al. | 74/866 |
| 4,918,606 | 4/1990 | Ito et al. | 364/424.1 |
| 4,955,258 | 9/1990 | Ito et al. | 364/424.1 X |
| 5,016,174 | 5/1991 | Ito et al. | 364/424.1 |
| 5,033,328 | 7/1991 | Shimanaka | 364/424.1 X |

*Primary Examiner*—Richard Lorence
*Assistant Examiner*—Khoi Q. Ta
*Attorney, Agent, or Firm*—Burns, Doane, Swecker & Mathis

[57] ABSTRACT

An hydraulic control device for an automatic transmission includes a plurality of controlling valves connected to related friction engaging elements. A plurality of solenoid valves are connected to the controlling valves for supplying hydraulic pressure thereto. A checking device determines whether an upshift of the transmission is performed or not. A detector determines a detected value of either a RPM count of an engine of the vehicle or a longitudinal acceleration of the vehicle. A fail-safe device prevents the upshift based on a comparison of the detected value with a predetermined value.

5 Claims, 9 Drawing Sheets

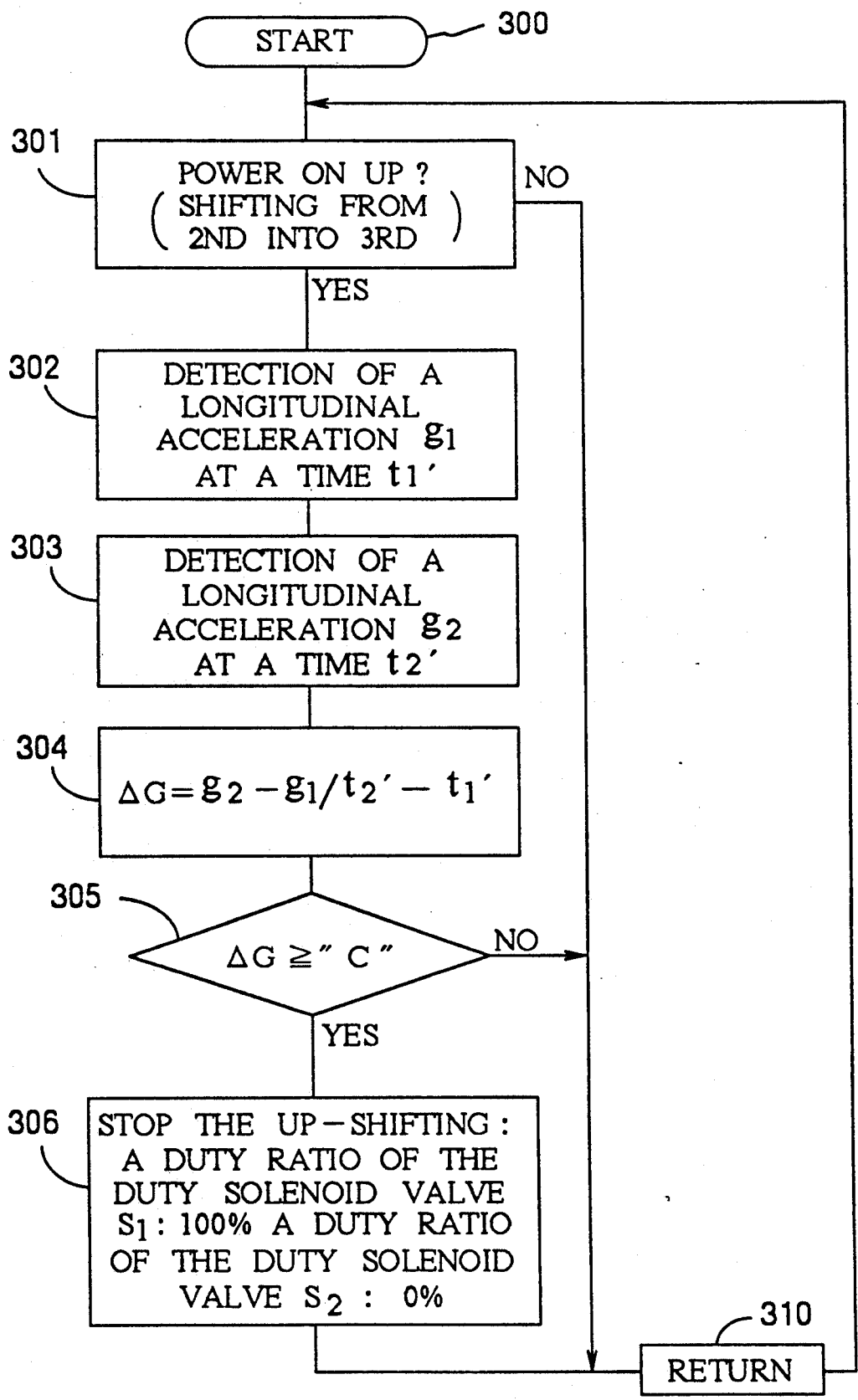

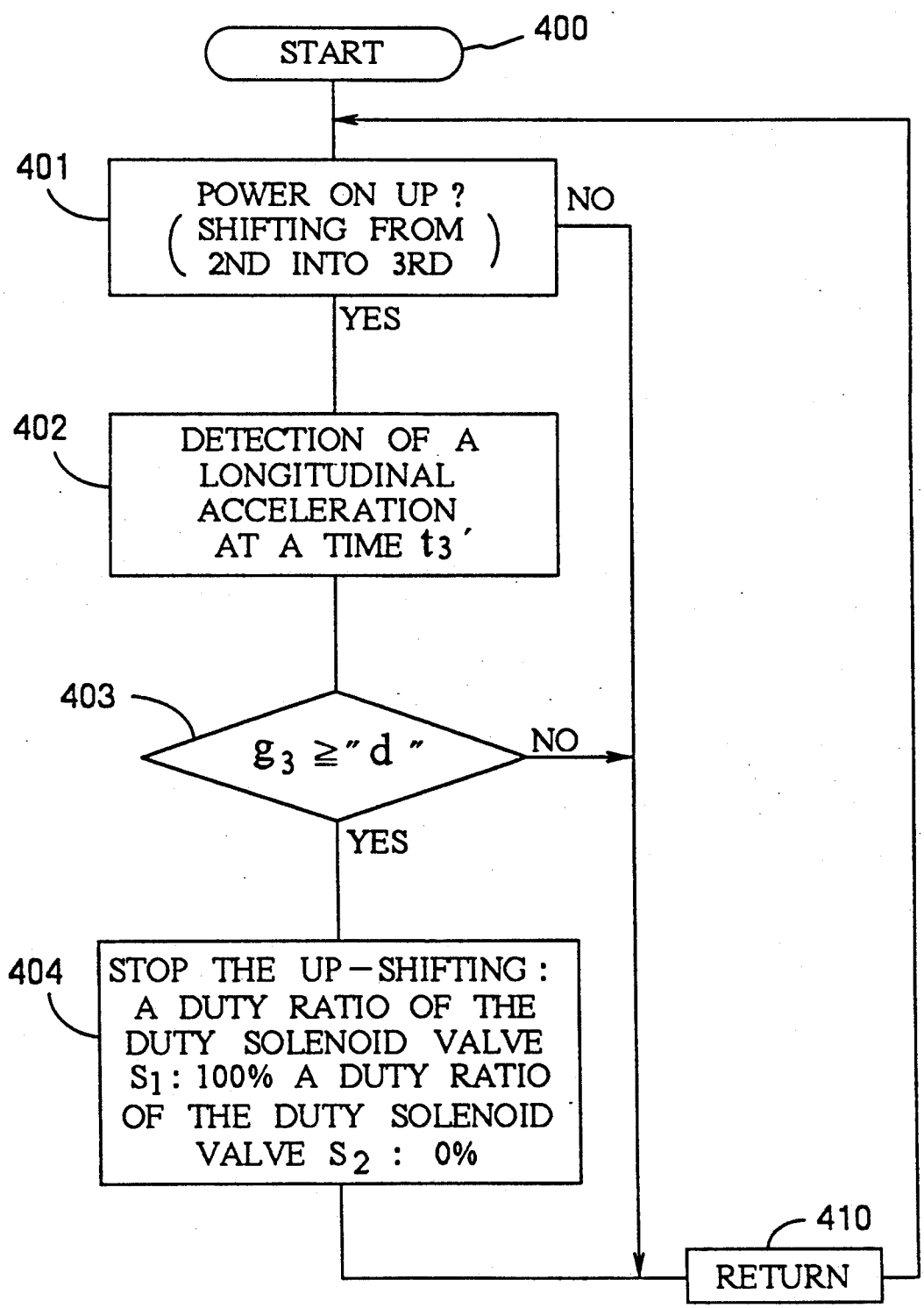

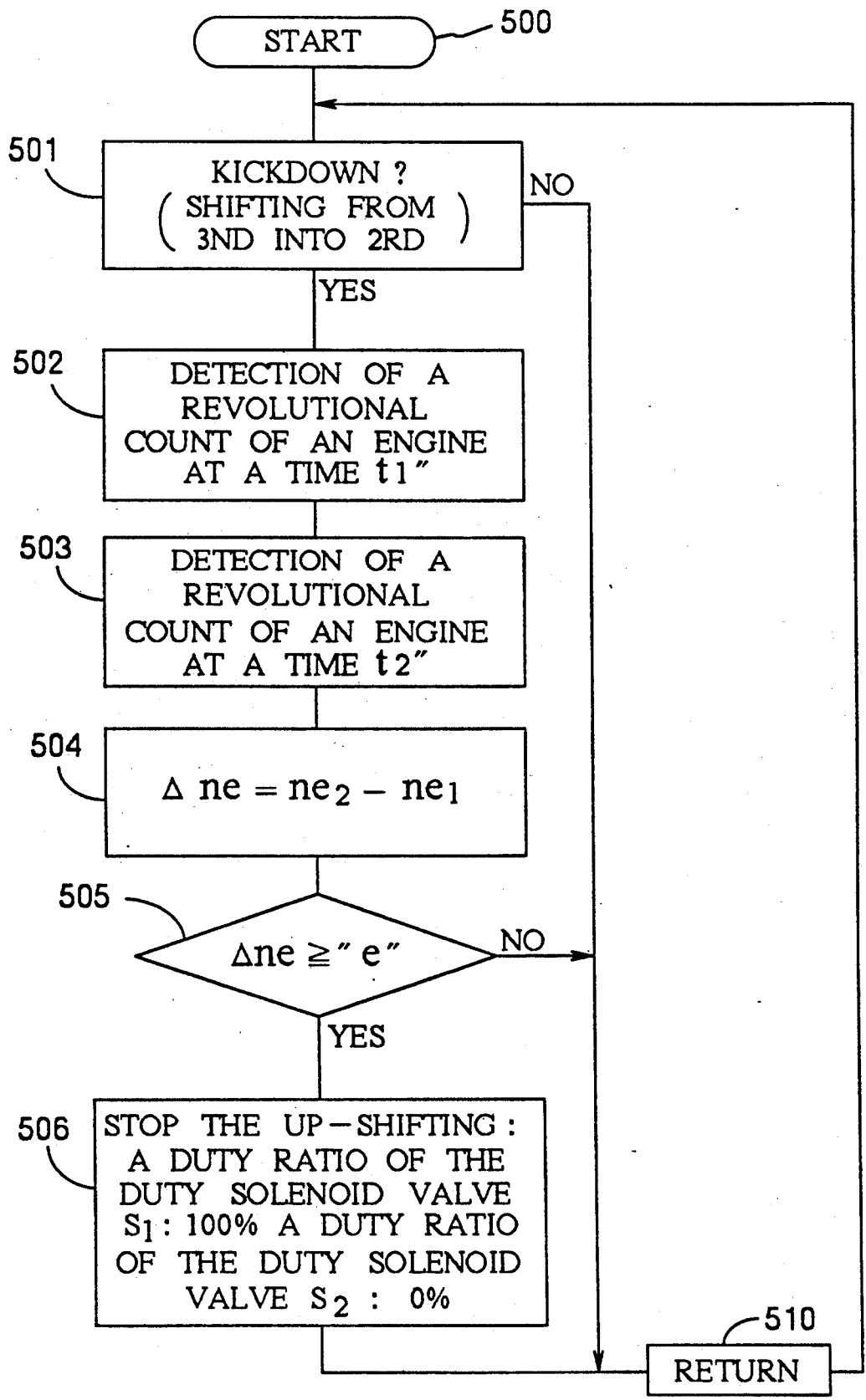

HYDRAULIC CONTROL DEVICE FOR AUTOMATIC TRANSMISSION

BACKGROUND OF THE INVENTION

1. Field of the Invention

This invention relates to a hydraulic control device for an automatic transmission for use in an automotive vehicle or other vehicle and more particularly to a hydraulic control device for an automatic transmission which is provided with a fail safe device against damages of mechanical parts such as friction engaging elements in the automatic transmission.

2. Description of the Related Art

The conventional electric control transmission in which a self-diagnostic function is built is provided with a fail safe device in order to prevent the malfunction of electrical components such as sensors and solenoids.

However, in the foregoing conventional device, trouble or damage to mechanical parts such as friction engaging elements in the automatic transmission can occur and such trouble or damage should be detected as soon as possible.

SUMMARY OF THE PRESENT INVENTION

It is an object of the present invention to provide a hydraulic control device for an automatic transmission which is further provided with a fail safe device which operates in such manner that when friction engaging elements fail to properly function during shifting from a low gear to a higher gear according to the throttle opening, the shifting operation is stopped.

BRIEF DESCRIPTION OF THE DRAWINGS

These and other objects, features and advantages of the present invention will become fully apparent on reading the following detailed description with reference to the accompanying drawings, wherein like members bear like reference numerals, and wherein:

FIG. 6 is a flow chart illustrating operation of a third embodiment of the present invention;

FIG. 8 is a flow chart illustrating operation of a fourth embodiment of the present invention;

FIG. 9 is a flow chart illustrating operation of a fifth embodiment of the present invention.

DETAILED DESCRIPTION OF A PREFERRED EMBODIMENT OF THE INVENTION

Figure 1:
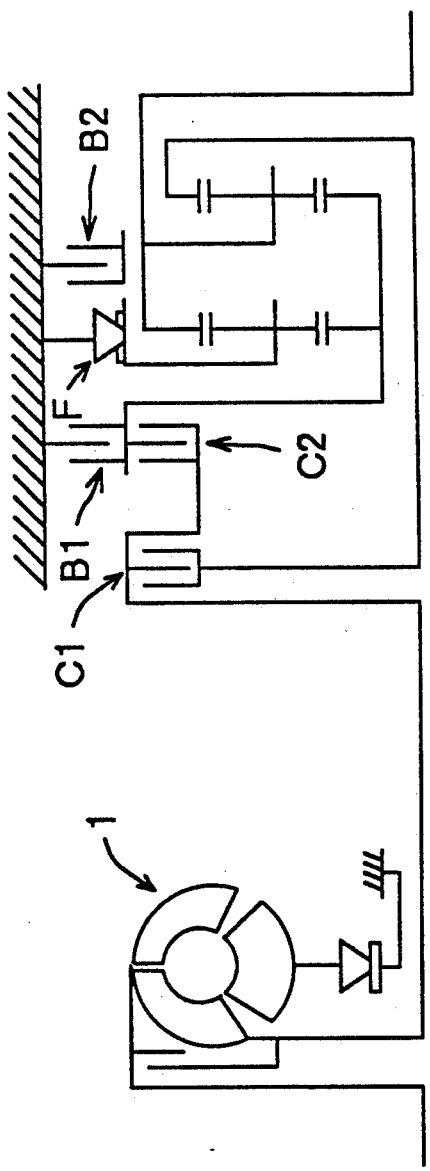
FIG. 1 is a schematically depicted gear train which is controlled by a hydraulic control device for an automatic transmission according to the present invention.
Figure 2:
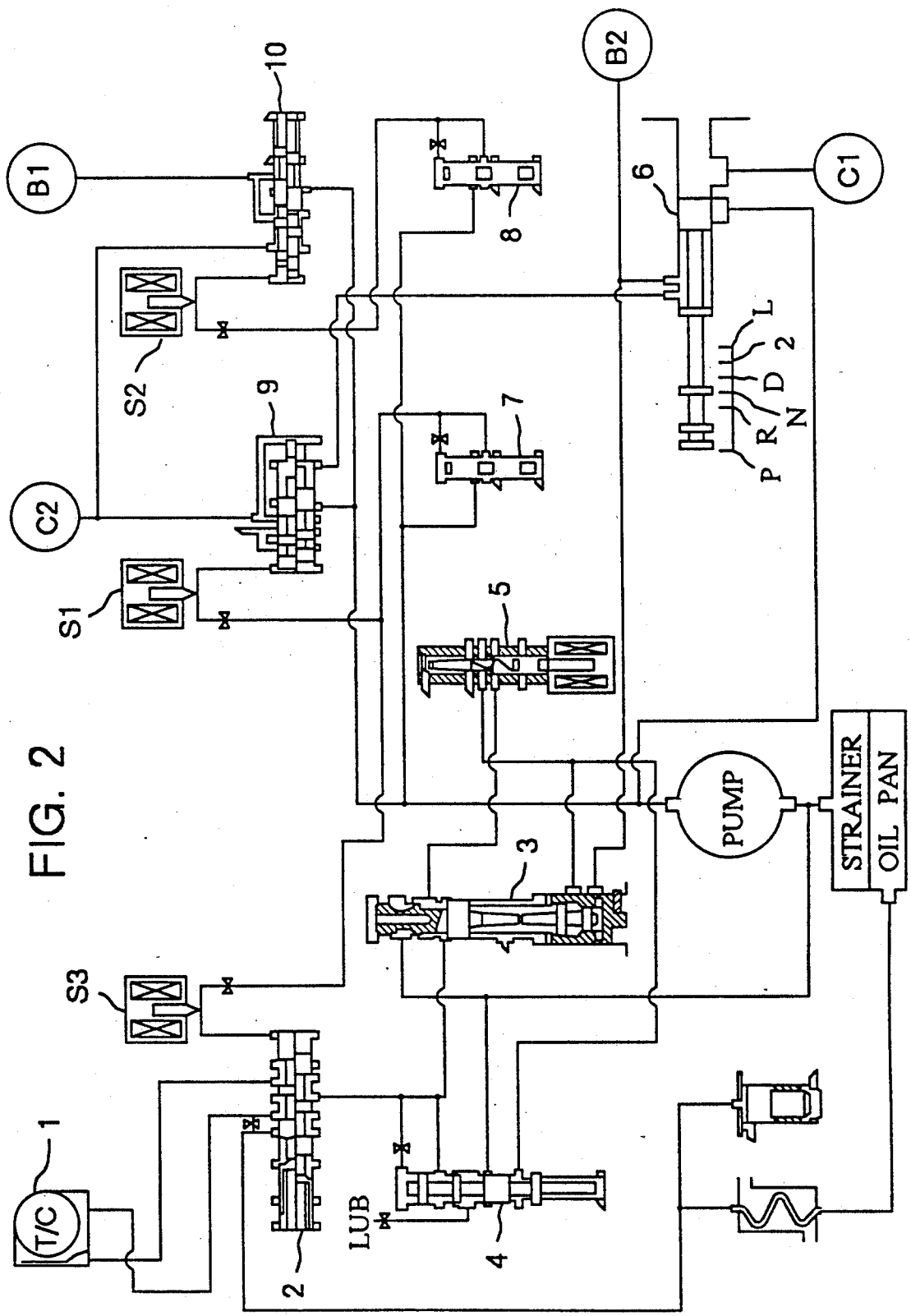
FIG. 2 is a schematically depicted hydraulic circuit of a hydraulic control device for an automatic transmission according to the present invention.

With reference to FIG. 1 and FIG. 2, numeral 1 refers to a torque converter and numeral 2 refers to a torque converter lock-up valve and a regulator valve is indicated at 3 while a secondary regulator valve is shown at 4. Numeral 5 indicates a throttle valve while numeral 6 is a manual shift valve. Numerals 7 and 8 are modulator valves. Numeral 9 indicates a control valve for friction clutch C2 and numeral 10 indicates a control valve for a servo brake B1. S1 is a solenoid valve for the friction clutch C2, S2 is a solenoid valve for the servo brake B1, S3 is a solenoid valve for the lock-up valve 2, and S1, S2, S3 are of the normally closed type.

In the following table, a relationship between each friction engaging element and each shifting position is shown.

| friction engaging element solenoid | | C1 | C2 SOL1 | B1 SOL2 | B2 |
|---|---|---|---|---|---|
| D | 3rd | O | O | X | X |
|   | 2nd | O | X | O | X |
|   | 1st | O | X | X | X |
| L | 1st | O | X | X | O |
|   | REV. | X | O | X | O |

O: engaged
X: disengaged

Figure 3:
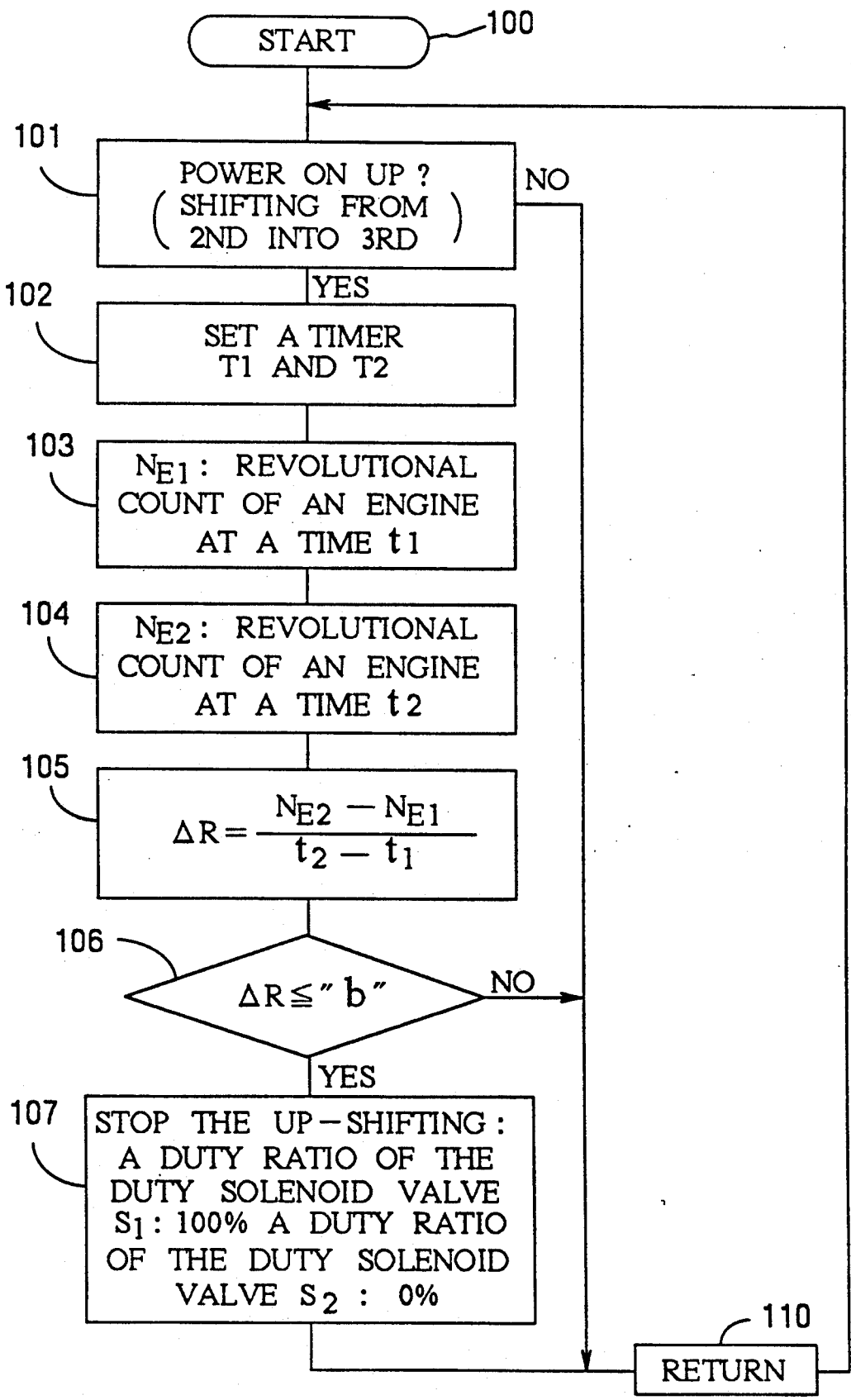
FIG. 3 is a flow chart illustrating an operation of an embodiment of the present invention.
Figure 4:
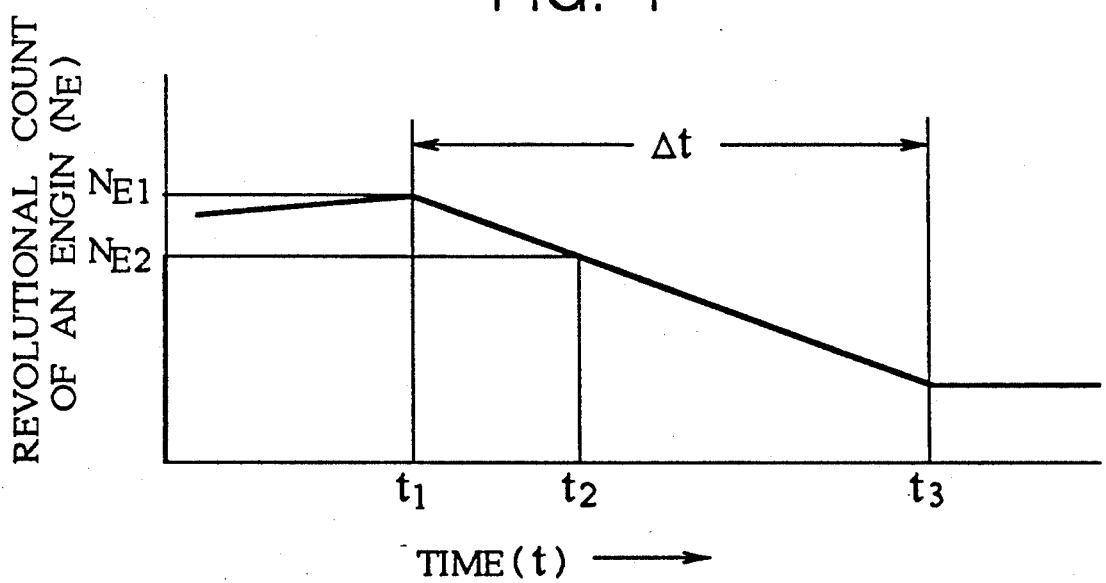
FIG. 4 is a characteristic diagram of engine RPM vs time during an upshift of the transmission.

Referring to FIG. 3, a predetermined program is executed at a start step 100. Step 101 is to determine whether Power on upshift (namely upshifting from 2nd into 3rd by increased throttle opening). If not, the execution is returned to the step 100 through a step 110. If so, then step 102 is performed. In the step 102, as shown in FIG. 4, timers T1 and T2 are set or initiated. In a step 102, revolutions per minute (RPM) of an engine NE1 (NE2) is detected at 103, 104 when an elapsed time t1 (t2) is counted by the timer T1 (T2). In step 105 a calculation is performed based on the following formula:

$$\triangle R = \frac{N_{E2} - N_{E1}}{t2 - t1}$$

Step 106 executes a comparison between the real value $\triangle R$ and a predetermined value "b". If $\triangle R >$ "b", a duty ratio of the solenoid valve S1 is set to be 0 percent whereby the friction clutch C2 is engaged as well as a duty ratio of the solenoid valve S2 is set to be 100 percent whereby the servo brake B1 is released. As a result, up-shifting from 2nd into 3rd is executed. If $\triangle R \leq$ "b", mechanical parts of the friction engaging elements such as the friction clutches C1,C2 and the servo brakes B1, B2 are determined to be subject to change. Therefor, a duty ratio of the solenoid valve S1 is set to be 100 percent whereby the friction clutch C2 is released as well as a duty ratio for the solenoid valve S2 is set to be 0 percent, whereby the servo brake B1 is engaged. As a result, up-shifting from 2nd into 3rd is prevented as is any possible damage to the mechanical parts of the friction engaging elements.

Figure 5:
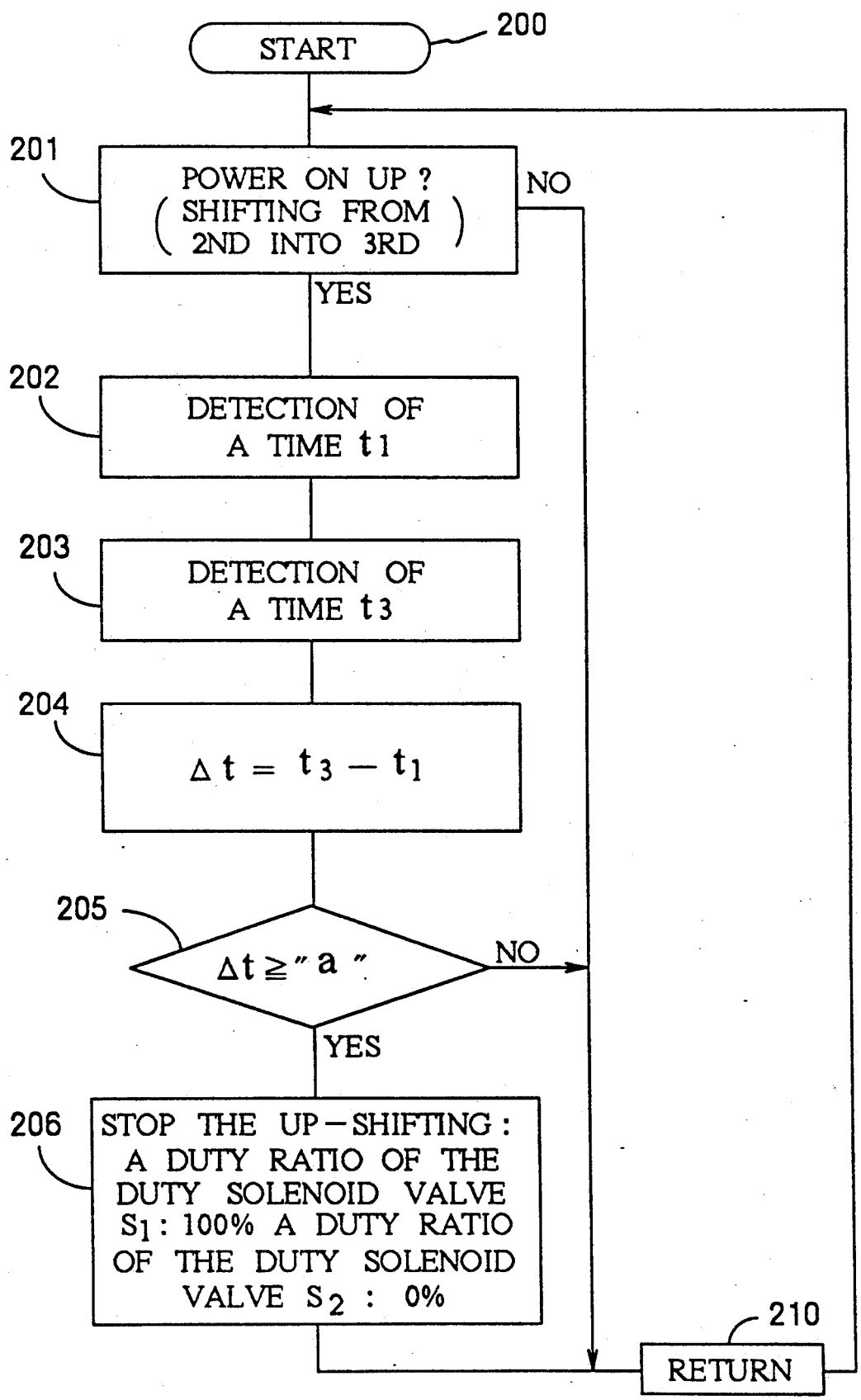
FIG 5 is a flow chart illustrating operation of a second embodiment of the present invention.

Referring to FIG. 5, a flow chart similar to that in FIG. 3 is illustrated. Step 201 is to determine whether Power on upshift is requested. If so, a step 202 is performed. In the step 202, as shown in FIG. 4, a time t1 is detected when the RPM of the engine begins to decrease during the up-shifting, and in a step 203 a time t3 is detected when the RPM of the engine has stopped decreasing and is substantially steady with respect to time. Then, a deviation $\triangle t$ between t3 and t1 is calculated in step 204. Step 205 executes a comparison between the deviation t and a predetermined value "a". If $\triangle t <$ "a", a duty ratio of the solenoid valve S1 is set to be 0 percent whereby the friction clutch C2 is engaged as well as a duty ratio of the solenoid valve S2 is set to be 100 percent whereby the servo brake B1 is released. As a result, up-shifting from 2nd to 3rd is executed. If $\triangle t \geq$ "a", mechanical parts of the friction engaging elements such as the friction clutches C1, C2 and the servo brakes B1, B2 are determined to be subject to damage. Therefore, a duty ratio of the solenoid valve S1 is set to be 100 percent whereby the friction clutch C2 is released as well as a duty ratio of the solenoid valve S2 is set to be 0 percent whereby the servo brake B1 is engaged. As a result, up-shifting from 2nd into 3rd is not permitted and possible damage to the mechanical parts of the friction engaging elements is prevented.

Figure 7:
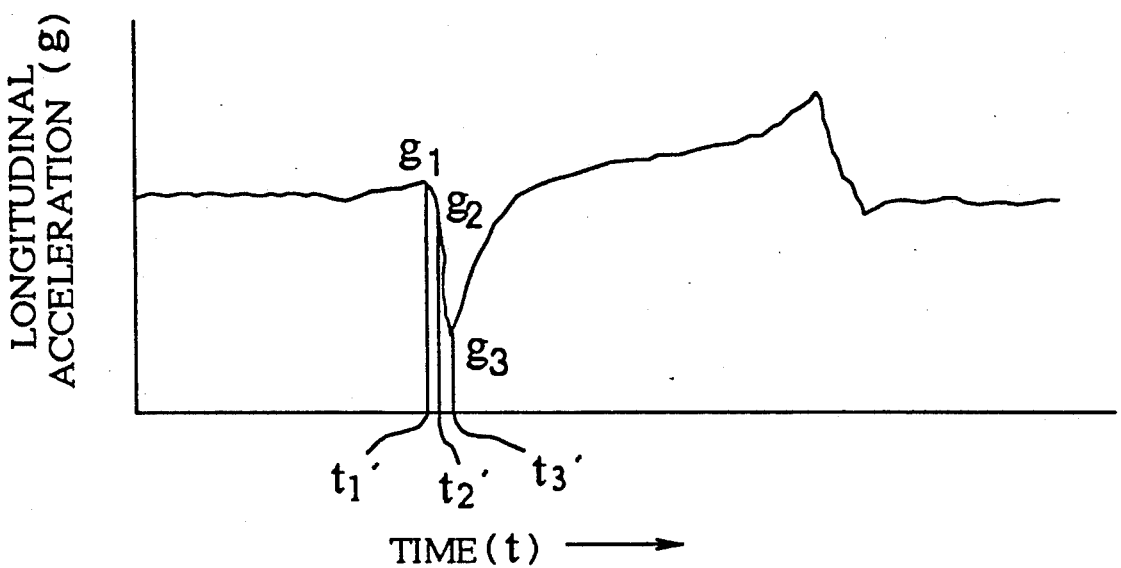
FIG. 7 is a characteristic diagram of longitudinal acceleration of a vehicle.

Referring to FIG. 6, step 301 determines whether to initiate power upshift (up-shifting from 2nd into 3rd by increased throttle opening is established). If not, the execution is returned to step 300 through step 310. If so, then step 302 is performed. In the step 302, as shown in FIG. 7, timers $T_1$ and $T_2$ are set or initiated. In step 302 and step 303, longitudinal acceleration ($g_1$, $g_2$) of a vehicle is detected when an elapsed time t1', t2' is counted by the timer T1, 'T2'. In step 304 a calculation is performed based on the following formula.

$$\triangle G = \frac{g2 - g1}{t2' - t1'}$$

Step 306 executes a comparison between the real value $\triangle G$ and a predetermined value "c". If $G <$ "c", a duty ratio of the solenoid valve S1 is set to be 0 percent whereby the friction clutch C2 is engaged as well as a duty ratio of the solenoid valve S2 is set to be 100 percent whereby the servo brake B1 is released. As a result, upshifting from 2nd to 3rd is executed. If $\triangle G \geq$ "c", mechanical parts of the friction engaging elements such as the friction clutches C1, C2 and the servo brakes B1, B2 could be damaged. Therefore, a duty ratio of the solenoid valve S1 is set to be 100 percent whereby the friction clutch C2 is released as well as a duty ratio of the solenoid valve S2 is set to be 0 percent, whereby the servo brake B1 is engaged. As a result, upshift from 2nd to 3rd is prevented as well as preventing possible damage to the mechanical parts.

Referring to FIG. 8, a flow chart similar to that in FIG. 6 is illustrated. Step 401 is to determine whether Power on upshift is requested (namely upshifting from 2nd to 3rd by throttle opening position). If so, step 402 is performed. In the step 402, as shown in FIG. 7, a minimum longitudinal acceleration at a time t3 is detected during the upshifting, and in a step 403 the minimum longitudinal acceleration g3 and a predetermined value of acceleration "d" is compared. If g3< "d", a duty ratio of the solenoid valve S1 is set to be 0 percent whereby the friction clutch C2 is engaged as well as a duty ratio of the solenoid valve S2 is set to be 100 percent whereby the servo brake B1 is released. Thus, upshifting from 2nd into 3rd is executed. If g3≥"d", mechanical parts for the friction engaging elements such as the friction clutches C1, C2 and the servo brakes B1, B2 are deemed to be subject to damage. Therefore, a duty ratio of the solenoid valve S1 is set to be 100 percent whereby the friction clutch C2 is released as well as a duty ratio of the solenoid valve S2 is set to be 0 percent whereby the servo brake B1 is engaged. Thus, upshifting from 2nd into 3rd is prevented as is damage to the mechanical parts of the friction engaging mechanism.

Figure 10:
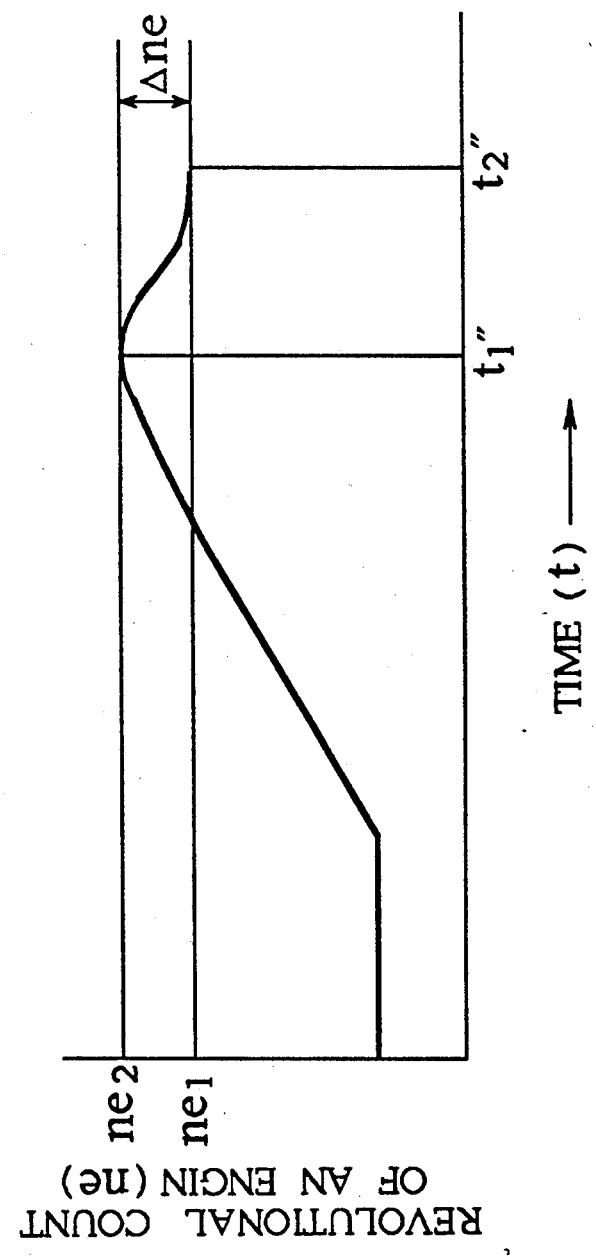
FIG. 10 is a characteristic diagram of engine RPM vs. time during a downshift of the transmission.

Referring to FIG. 9, a step 501 is to determine whether kickdown (namely downshifting from 3rd into 2nd by increased throttle opening is established. If so, a step 502 is performed. In the step 502, as shown in FIG. 10, the engine RPM (Ne1) is detected at a time t1" corresponding to a point of decreasing RPM of the engine during the upshifting, and in a step 503 the RPM of the engine (Ne2) is detected at a time t2" when the decrease of the RPM of the engine is substantially steady with respect to time. Then, a deviation $\triangle$ Ne between Ne1 and Ne2 is calculated in step 404. A step 405 executes a comparison between the deviation $\triangle$ Ne and the predetermined RPM value "e". If $\triangle$ Ne< "e", a duty ratio of the solenoid valve S1 is set to be 0 percent whereby the friction clutch C2 is engaged as well as a duty ratio of the solenoid valve S2 is set to be 100 percent whereby the servo brake B1 is released. Thus, downshifting from 3rd into 2nd is executed. If $\triangle$ Ne ≥ "e", mechanical parts of the friction engaging elements such as the friction clutches C1, C2 and the servo brakes B1, B2 are considered to be subject to damage. Therefore, a duty ratio of the solenoid valve S1 is set to be 100 percent whereby the friction clutch C2 is released as well as a duty ratio of the solenoid valve S2 is set to be 0 percent whereby the servo brake B1 is engaged. Thus, downshifting from 3rd to 2nd is not established and possible damage to the mechanical parts is prevented.

The principles, preferred embodiments and modes of operation of the present invention have been described in the foregoing application. The invention which is intended to be protected herein should not, however, be construed as limited to the particular forms disclosed, as these are to be regarded as illustrative rather than restrictive. Variations and changes may be made by those skilled in the art without departing from the spirit of the present invention. Accordingly, the foregoing detailed description should be considered exemplary in nature and not limited to the scope and spirit of the invention as set forth in the appended claims.

What is claimed is:

1. An hydraulic control device for an automatic transmission comprising:

plurality of control valves hydraulically connected to related friction engaging elements;

a plurality of solenoid duty valves connected to said plurality of control valves for supplying hydraulic pressure thereto;

checking means for checking whether an upshift of the transmission is performed;

detecting means for detecting at least one value of engine RPM and longitudinal acceleration of said vehicle during the upshift, said detecting means includes detecting the RPM of the engine and calculating a change of RPM of the engine with respect to time; and abnormal condition detecting means for detecting abnormal conditions based on a comparison of one of said detected values with a predetermined value.

2. An hydraulic control device for an automatic transmission comprising:

a plurality of control valves hydraulically connected to related friction engaging elements;

a plurality of solenoid duty valves connected to said plurality of control valves for supplying hydraulic pressure thereto;

checking means for checking whether an upshift of the transmission is performed;

detecting means for detecting at least one value of engine RPM and longitudinal acceleration of said vehicle during the upshift, said detecting means detects a first time when the RPM of the engine begins to decrease and a second time when said decrease of the RPM of the engine ceases and calculates a deviation between said first time and said second time; and abnormal condition detecting means for detecting abnormal conditions based on a comparison of one of said detected values with a predetermined value.

3. An hydraulic control device for an automatic transmission comprising:
- a plurality of control valves hydraulically connected to related friction engaging elements;
- a plurality of solenoid duty valves connected to said plurality of control valves for supplying hydraulic pressure thereto;
- checking means for checking whether an upshift of the transmission is performed;
- detecting means for detecting at least one value of engine RPM and longitudinal acceleration of said vehicle during the upshift, said detecting means detects the longitudinal acceleration of the vehicle and obtains said detected value by calculating a change of longitudinal acceleration of the vehicle with respect to time; and
- abnormal condition detecting means for detecting abnormal conditions based on a comparison of one of said detected values with a predetermined value.

4. An hydraulic control device for an automatic transmission comprising:
- a plurality of control valves hydraulically connected to related friction engaging elements;
- a plurality of solenoid duty valves connected to said plurality of control valves for supplying hydraulic pressure thereto;
- checking means for checking whether an upshift of the transmission is performed;
- detecting means for detecting at least one value of engine RPM and longitudinal acceleration of said vehicle during the upshift, said detecting means detects said detected value as a minimum longitudinal acceleration of the vehicle when a decrease in engine RPM ceases; and
- abnormal condition detecting means for detecting abnormal conditions based on a comparison of one of said detected values with a predetermined value.

5. An hydraulic control device for automatic transmission comprising:
- a plurality of control valves connected to related friction engaging elements;
- a plurality of solenoid valves connected to said plurality of control valves for supplying hydraulic pressure thereto;
- checking means for checking whether a downshift is performed;
- detecting means for detecting a first engine RPM at a first time when an increase in engine RPM ceases and a second engine RPM at a second time when a decrease in engine RPM ceases; and obtaining a deviation between said first RPM and said second RPM; and
- fail-safe means for preventing a downshift based on a comparison of said deviation value with a predetermined value.

* * * * *